United States Patent [19]

Kukaya et al.

[11] 4,345,189
[45] Aug. 17, 1982

[54] MOTOR ROTATION SPEED CONTROL CIRCUIT

[75] Inventors: Hirokazu Kukaya; Jun Kishi, both of Tokyo, Japan

[73] Assignee: Nippon Electric Co., Ltd., Tokyo, Japan

[21] Appl. No.: 187,853

[22] PCT Filed: Feb. 28, 1979

[86] PCT No.: PCT/JP79/00050
§ 371 Date: Oct. 29, 1979
§ 102(e) Date: Oct. 29, 1979

[87] PCT Pub. No.: WO79/00714
PCT Pub. Date: Oct. 4, 1979

[30] Foreign Application Priority Data

Feb. 28, 1978 [JP] Japan .................................. 53-23109

[51] Int. Cl.³ .............................................. H02P 1/00
[52] U.S. Cl. .................................... 318/317; 318/331; 318/332; 318/345 AB
[58] Field of Search ........ 318/317, 331, 332, 345 CA, 318/345 AB, 459

[56] References Cited

U.S. PATENT DOCUMENTS

| 4,163,182 | 7/1979 | Tanikoshi | 318/331 |
| 4,227,127 | 10/1980 | Fukaya et al. | 318/331 X |
| 4,234,835 | 11/1980 | Ota et al. | 318/331 X |
| 4,274,036 | 6/1981 | Fukasaku et al. | 318/331 |

Primary Examiner—Gene Z. Rubinson
Attorney, Agent, or Firm—Sughrue, Mion, Zinn, Macpeak & Seas

[57] ABSTRACT

A rotation speed control circuit is designed to control the rotational speed of a motor at a constant speed, despite variations in both the load and the power supply. A motor (100') and a resistor (R) are connected to a power supply terminal, respectively. A control circuit (200') receives an operation voltage from the resistor R and supplies an output to the other end of the motor (100'). Within the control circuit (200'), the operation voltage is supplied to one end of a comparator (10) through a constant voltage generator (9), and the output is supplied to the other end of the comparator (10) through a resistor ($R_{11}$). A output circuit (11) supplies currents both to the motor (100') and to the resistor (R), respectively, in response to the output of the comparator (10).

12 Claims, 5 Drawing Figures

MOTOR ROTATION SPEED CONTROL CIRCUIT

BACKGROUND OF THE INVENTION

1. Technical Field

The present invention relates to a circuit for maintaining the rotational speed of a motor at a constant, and more particularly to improvements in a current control type motor rotational speed regulator including a negative impedance, such that even if variations in the power supply voltage should occur, the rotational speed of the motor does not vary.

2. Background Art

In a current control type motor rotational speed regulator including a negative impedance as disclosed in U.S. Pat. No. 4,227,127, commonly owned, a voltage supply terminal of a power supply is connected to an input terminal of a control circuit through a resistor having a resistance proportional to an internal resistance of the motor, while the opposite terminals of the motor are connected respectively to the voltage supply terminal of the power supply and to an output terminal of the control circuit. Within the control circuit, the voltage applied to the input terminal has been subjected to a constant voltage drop, and then the dropped voltage is compared with the voltage at the output terminal. By this compared output, the current values are controlled so that the same current value may be applied to both the motor and the resistor to produce a constant counter electro-motive-force generated by the rotation of the motor.

Under variations of the load applied to the motor, the above-described motor rotational speed regulator can maintain a constant rotational speed regardless of the variation of the load, as a result of the fact that variation in the counter electro-motive-force of the motor is detected by the comparator, and the currents flowing through the motor and the resistor are controlled so as to keep the counter electro-motive-force constant. Thereby, the rotational speed of the motor is regulated so that the counter electro-motive-force may take a preset constant voltage value, as fully described in the specification of the above U.S. patent. However, when the voltage of the power supply varies, the current flowing through the resistor varies and consequently a constant rotational speed cannot be obtained. In other words, the above-mentioned motor speed regulator of the prior art has a disadvantage in that the rotational speed of the motor varies in accordance with variations in the voltage of the power supply.

SUMMARY OF THE INVENTION

It is one object of the present invention to provide a rotational speed control circuit for a motor in which the controlled rotational speed of the motor would not vary even if the power supply voltage varies.

According to one feature of the present invention, there is provided a rotational speed control circuit for a motor comprising a motor and a first resistive element, each of which has one end connected to a power supply terminal, a constant voltage generator connected to the other end of the first resistive element, a comparator for comparing the voltage at the other end of the constant voltage generator with that at the other end of the motor, and an output circuit for feeding first and second output currents to the first resistive element and the motor, respectively, in response to the output of the comparator, the other end of the motor being applied via a second resistive element to the comparator so that the comparator may compare the voltage at the other end of the second resistive element with the voltage at the other end of the constant voltage generator.

Owing to the aforementioned features of the present invention, if the resistances of the first and second resistive elements are selected appropriately, voltage drops across these resistive elements will vary in accordance with the variation of the power supply voltage, and thereby the output current driven by the output of the comparator will prevent the rotational speed of the motor from varying.

BRIEF DESCRIPTION OF THE DRAWINGS

Referring now to the drawings, the present invention is explained in more detail.

Referring now to FIGS. 1 and 2 of the drawings, a motor rotational speed control circuit according to a current control system including a negative impedance of the prior art is constructed such that a motor 100 to be controlled is connected between one terminal Vcc for a power supply and an output terminal 2 of a control circuit 200, and a resistor R is connected between the power supply terminal Vcc and an input terminal 1 of the control circuit 200. A terminal 3 of the control circuit 200 is grounded. In the control circuit 200 according to the current control system as shown in FIG. 2, the input terminal 1 is connected to a constant current source 4, a reference voltage generator 5 and an output circuit 7. The voltage at the input terminal 1 is inputted to a reference terminal $\overline{a}$ of an error amplifier 6 after it has been lowered in voltage by the magnitude of the reference voltage by the reference voltage generator 5. The voltage at the reference terminal $\overline{a}$ is compared with the voltage at the output terminal 2 which is applied to the comparison terminal $\overline{b}$. The compared output is inputted to the output circuit 7, and an output of the output circuit 7 is derived at the output terminal 2. In the output circuit 7, a current mirror circuit is composed of transistors $Q_1$, $Q_2$ and $Q_3$ and resistors $R_4$ and $R_5$ so that the collector current of the transistor $Q_2$ may be equal to the sum of the collectors of the transistors $Q_1$ and $Q_3$.

In such a motor speed control circuit, when the rotational speed of the motor varies, the counter electromotive-force of the motor will vary, and so, the variation in the counter electro-motive-force is compared with a reference voltage of the reference voltage generator 5 by the error amplifier 6 to maintain the rotational speed of the motor at a constant. However, this motor speed regulator has a disadvantage in that if the voltage of the power supply is varied, then the rotational speed of the motor 100 is varied. More particularly, if the power supply voltage rises, then the voltage between the terminals of the motor 100 becomes larger and thereby the rotational speed is increased. However, in practice, according to such rotational speed compensation, if the gain of the control circuit 200 is raised, then not only is the liability of being affected by voltage variations reduced, but also load characteristics and temperature characteristics can be improved. But on the other hand, instability of operation is increased, making oscillation (high frequency oscillation, hunting, etc.) of the control system apt to occur. Consequently, it was difficult to eliminate variations in the rotational speed of the motor caused by variations in the power supply voltage by merely raising the gain of the control.

BEST MODE OF CARRYING OUT THE INVENTION

Figure 1:
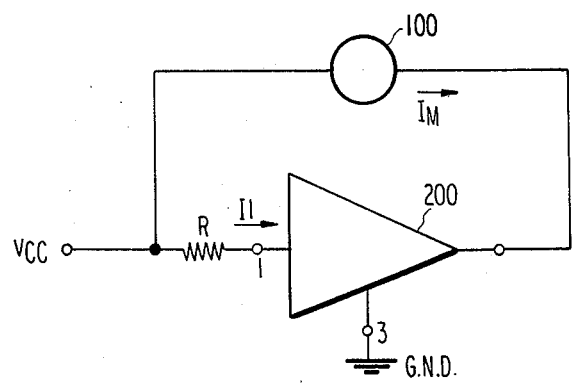
FIG. 1 is a block diagram for explaining the principles of a motor rotational speed regulator.
Figure 2:
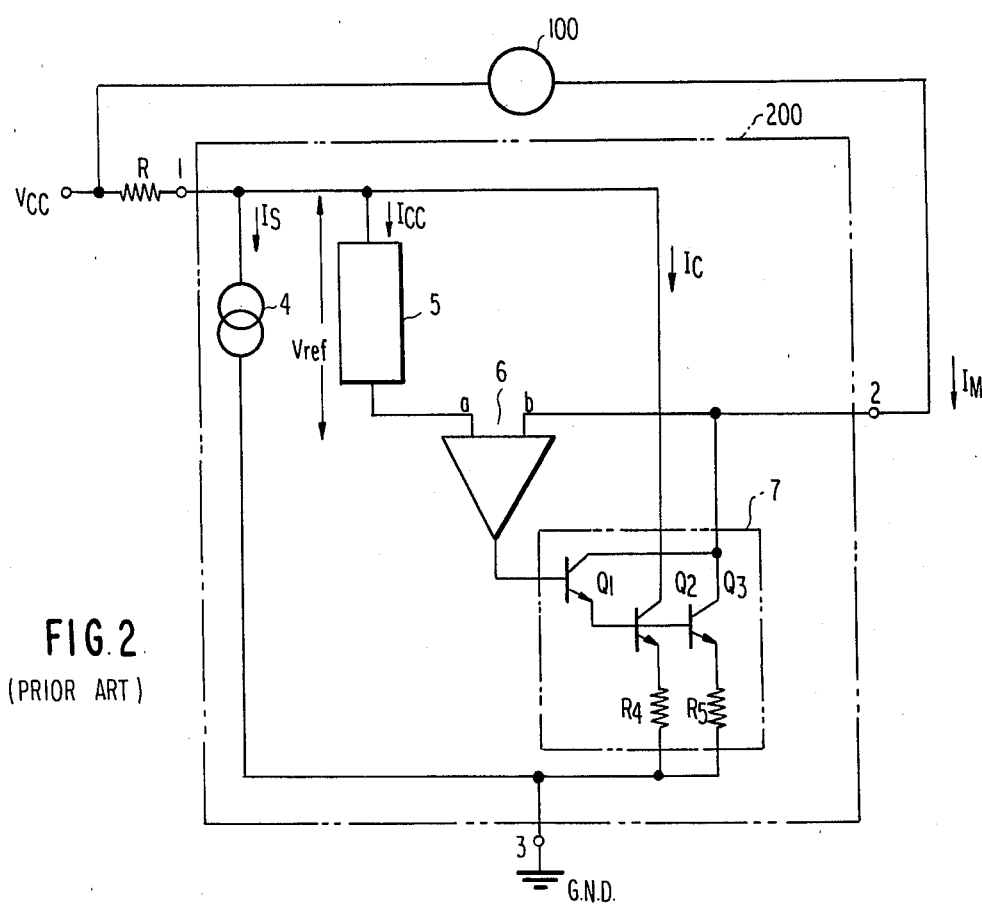
FIG. 2 is a circuit diagram showing a motor rotational speed regulator of the prior art.
Figures 3, 4:
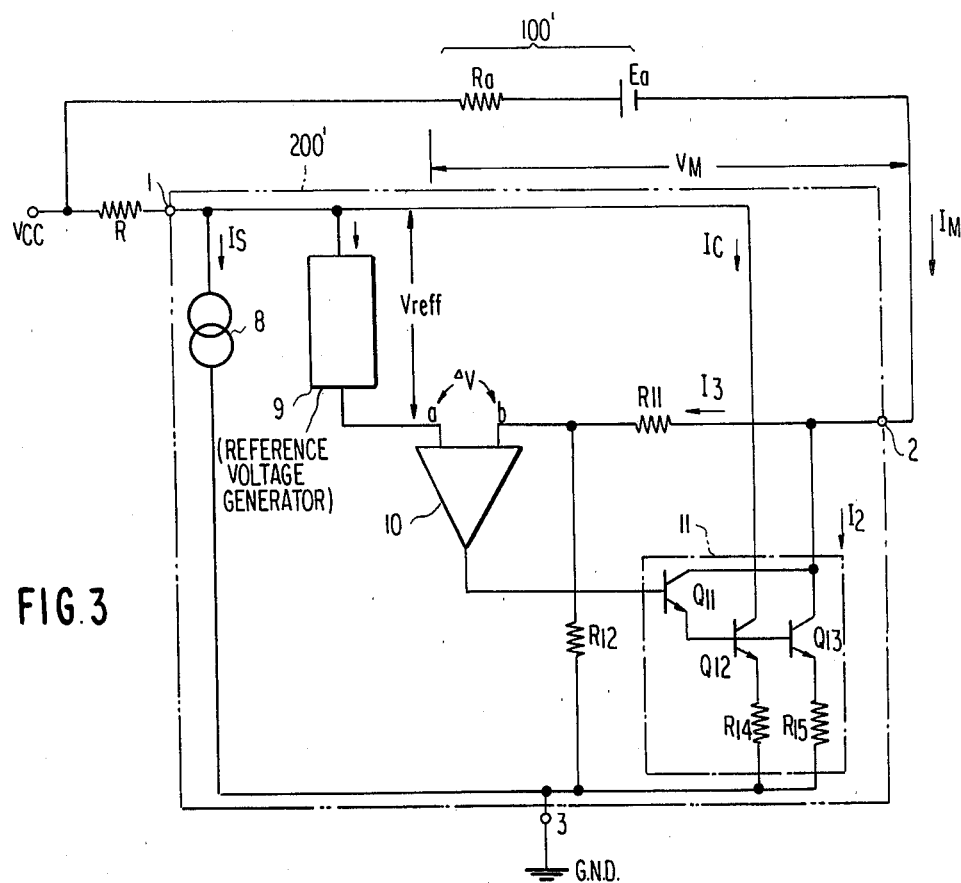
FIG. 3 is a circuit diagram showing a first preferred embodiment of the present invention.
FIG. 4 is a diagram for explaining the operation of the first preferred embodiment of the present invention.

With reference to FIG. 3, in the circuit construction according to the first preferred embodiment of the present invention, between a power supply terminal $V_{cc}$ and an output terminal 2 of a control circuit 200' is connected a motor having an internal resistance $R_a$ whose value is 20Ω and a counter electro-motive-force $E_a$, and between the power supply terminal $V_{cc}$ and an input terminal 1 of the control circuit 200' is connected a resistor R of 400Ω. To the input terminal 1 are also connected a constant current source 8 and a reference voltage generator 9. The reference voltage generator 9 lowers the voltage at input terminal 1 by 1.2 v, and is connected to a reference terminal $\bar{a}$ of an error amplifier 10. The error amplifier 10 compares the voltage at the terminal $\bar{a}$ with the output voltage at the output terminal 2 which is applied via a resistor $R_{11}$ to a comparison terminal $\bar{b}$. The output of the error amplifier 10 is connected to an output circuit 11 which is essentially a current mirror circuit consisting of transistors $Q_{11}$, $Q_{12}$ and $Q_{13}$ and resistors $R_{14}$ and $R_{15}$. In addition, a junction point between the comparison terminal $\bar{b}$ of the error amplifier 10 and the resistor $R_{11}$ is connected to a terminal 3 via a resistor $R_{12}$, and this terminal 3 is grounded. In this embodiment, the counter electromotive-force and the rotation speed of the motor 100' are respectively designed to be 4.5 v and 2,200 r.p.m., and the resistance values of the resistor $R_{11}$ and $R_{12}$ are 100Ω and 27 KΩ, respectively.

In the above-described circuit, as will be explained with reference to the following equations, when the power supply voltage $V_{cc}$ rises, the voltage across the resistor $R_{11}$ is increased and thereby the output from the output circuit 11 varies so as not to change the rotational speed of the motor.

The relevant mathematical equations are as follows:

$$R = k \cdot R_a, \quad I_2 = k \cdot I_c \quad (1)$$

$$V_{cc} = (I_c + I_{cc} + I_s)R + V_{ref} + \Delta V + I_3 R_{12} \quad (2)$$

$$V_{cc} = V_M + I_3(R_{11} + R_{12}) \quad (3)$$

$$V_M = E_a + R_a I_M \quad (4)$$

$$I_M = I_2 + I_3 \quad (5)$$

where

R: resistance between the power supply terminal $V_{cc}$ and the input terminal of the control circuit 200',
$R_a$: internal resistance of the motor,
$I_2$: sum of the collector currents of the transistors $Q_{11}$ and $Q_{13}$ in the output circuit 11,
$I_c$: current flowing through the collector of the transistor $Q_{12}$,
$I_{cc}$: current flowing into the reference voltage generator 9,
$I_s$: current flowing through the constant current source 8,
$V_{ref}$: constant voltage generated across the constant voltage generator 9,
$\Delta V$: voltage difference between the terminals $\bar{a}$ and $\bar{b}$ of the error amplifier 10,
$I_3$: current flowing through the resistors $R_{11}$ and $R_{12}$,
$V_M$: voltage between terminals of the motor,
$E_a$: induction voltage in the motor, and
$I_M$: current flowing into the motor.

From Equations (1)–(5) above, the induction voltage Ea in the motor 100' becomes as follows:

$$E_a = (I_s + I_{cc})kR_a + V_{ref} + \Delta V - I_3(R_{11} + R_a) \quad (6)$$

In Equation (6) above, k is a constant factor, and $R_a$, $I_s$, $I_{cc}$ and $V_{ref}$ have constant values. Therefore, if the third and fourth terms in the right side of Equation (6), that is, $\Delta V - I_3(R_{11} + R_a)$ are nulled, then the induction voltage $E_a$ in the motor becomes independent of the power supply voltage $V_{cc}$. Since the induction voltage $E_a$ in the motor is proportional to the rotational speed of the motor, the possibility of maintaining this induction voltage $E_a$ constant means that the rotational speed of the motor can be maintained constant.

Now, the relation between the induction voltage $E_a$ and $I_3(R_{11} + R_a)$ is explained with reference to FIG. 4 in the case where the internal resistance $R_a$ of the motor and the resistance of the resistor $R_{12}$ are 5Ω and 25 KΩ, respectively. When the power supply voltage $V_{cc}$ changes from 5 V to 15 V, between the terminals $\bar{a}$ and $\bar{b}$ is generated the difference voltage ($\Delta V$) of 44 mV. Since the resistance of the resistor $R_{11}$ is selected to be sufficiently smaller than the resistor $R_{12}$, the current $I_3$ can be denoted by $$\frac{V_{cc} - V_M}{R_{11} + R_{12}},$$

and thereby this quantity is practically determined by the resistor $R_{12}$. For this reason, if the resistor $R_{11}$ is designed to be 45Ω, $I_3(R_{11} + R_a)$ becomes 22 mV, so that the difference voltage $\Delta V$ is larger than $I_3(R_{11} + R_a)$. The rotational speed of the motor in this case changes as shown by the solid line ① in FIG. 4. In addition, if the resistor $R_{11}$ is 195Ω, $I_3(R_{11} + R_a)$ becomes 88 mV, so that the difference voltage $\Delta V$ is smaller than $I_3(R_{11} + R_a)$. In this case, the rotation speed of the motor reduces as shown by the solid line ③ in the same figure, when the power supply voltage is high. Moreover, if the resistor $R_{11}$ is 95Ω, $I_3(R_{11} + R_a)$ is 44 mV, the same as the difference voltage $\Delta V$, and the rotational speed of the motor is constant irrespective of the variation of the power supply voltage as shown by the solid line ② in the same figure.

As described above, if the resistance value of the resistors $R_{11}$ and $R_{12}$ are selected so that $$\Delta V = I_3(R_{11} + R_a) \text{ or } \Delta V = \frac{V_{cc} - V_M}{R_{11} + R_a}(R_{11} + R_{12})$$

may be satisfied, the rotational speed can be made constant without regard to the value of the power supply voltage $V_{cc}$.

Though the resistors $R_{11}$ and $R_{12}$ are selected optionally with regard to the characteristics of the control circuit 200' and the motor 100', the voltage dependance of the rotational speed is ordinarily approximate 1%. Therefore, the difference voltage $\Delta V$ is also approximately several tens of mV. Additionally, since the current $I_M$ flowing into the motor is the sum of the current $I_2$ flowing through the output circuit 11 and the current $I_3$ flowing through the resistor $R_{11}$, the current $I_2$ flowing through the output circuit 11 becomes smaller when the current $I_3$ is large. Therefore, the control current fed by the transistor $Q_{13}$ become smaller so that the sufficient torque may not be obtained. Since this current $I_3$ is almost practically determined by the resistor $R_{12}$, the resistance of the resistor $R_{12}$ should be selected within the range of $1 \sim 300$ K$\Omega$. As a result, the resistance of the resistor $R_{11}$ is selected within the range of $10 \Omega$ to 5 K$\Omega$ so that $$\Delta V = I_3(R_{11} + R_a) \text{ or } \Delta V = \frac{V_{cc} - V_M}{R_{11} + R_{12}} (R_{11} + R_a)$$

may be satisfied. At this time, the difference voltage $\Delta V$ and the internal resistance $R_a$ of the motor can easily obtained by measurement.

Figure 5:
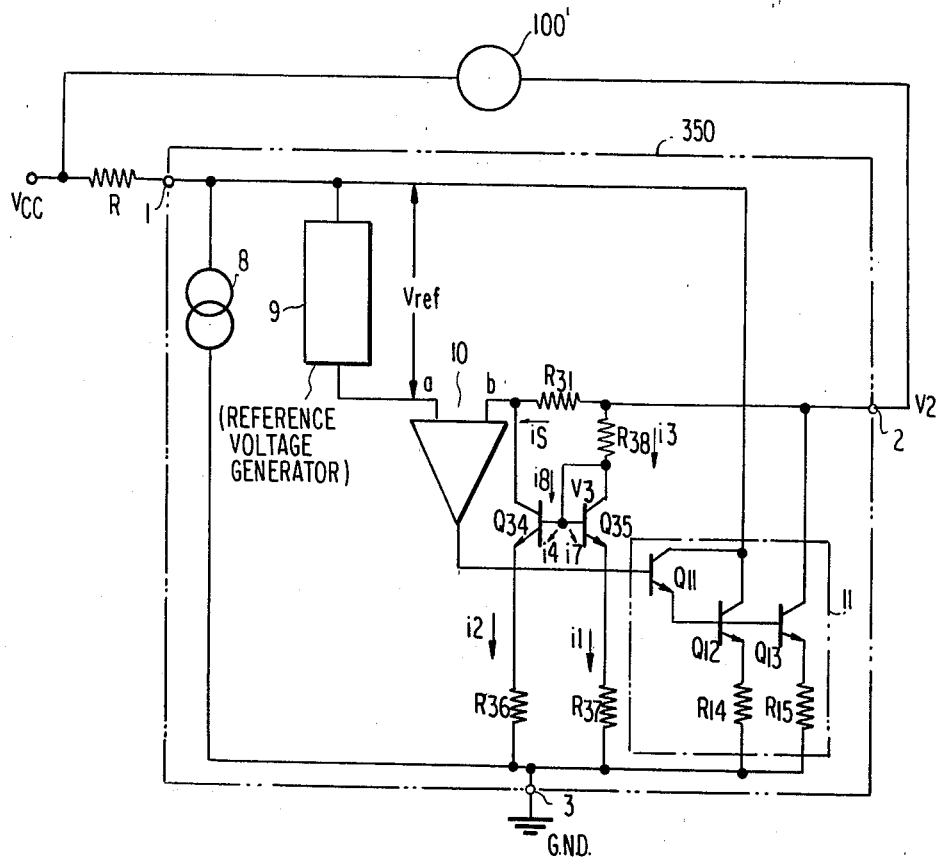
FIG. 5 is a circuit diagram showing a second preferred embodiment of the present invention.

Next, a second preferred embodiment of the present invention illustrated in FIG. 5 will be explained, where the motor 100' and the series path of the resistor R and the input and output terminals 1 and 2 of a control circuit 350 are connected in parallel between the power supply voltage $V_{cc}$ and the output terminal 2. Though the control circuit 350 is almost the same in construction as the control circuit 200' in FIG. 3, it is different in that a resistor $R_{31}$ is inserted between the input terminal 2 and the comparison terminal b, where both ends of this resistor $R_{31}$ are connected a current mirror circuit consisting of a transistor $Q_{34}$ and resistors $R_{36}$, $R_{37}$ and $R_{38}$.

When a motor is rotating at a rotational speed of 2,200 r.p.m. with a load of 8 g-cm and with a power source of 12 V, circuit constant factors presented in the following table are used:

TABLE

| $V_{cc}$ | 12 V | $V_{ref}$ | 1.2 V | $E_a$ | 4.5 V |
|---|---|---|---|---|---|
| $V_M$ | 6.5 V | R | 400$\Omega$ | $R_a$ | 20$\Omega$ |
| $R_{14}$ | 7.5$\Omega$ | $R_{15}$ | 0.38$\Omega$ | $R_{31}$ | 200$\Omega$ |
| $R_{36}$ | 1 K$\Omega$ | $R_{37}$ | 200$\Omega$ | $R_{38}$ | 12 K$\Omega$ |

In this case, the base-emitter junction area of of the transistor $Q_{34}$ and $Q_{35}$ are equal, and the current $I_s$ is 6.3 mA, the current $I_{cc}$, 15 mA, and the current $I_M$, 100 mA.

Next, the operation of the second preferred embodiment of the present invention will be explained by using the same variables as in the first preferred embodiment.

$$R = K \cdot R_a \quad (7)$$

$$I_2 = K \cdot I_c \quad (8)$$

$$V_{cc} = (I_c + I_{cc} + I_s)R + V_{ref} + \Delta V - i_5 R_{31} + V_2 \quad (9)$$

$$V_{cc} = V_M + V_2 \quad (10)$$

$$V_M = E_a + R_a I_M \quad (11)$$

where
 $I_5$: current flowing through the resistor $R_{31}$
 $R_{31}$: resistance of the resistor $R_{31}$
 $V_2$: voltage at the output terminal 2
By the equations (10) and (11), $$V_{cc} = E_a + R_a I_M + V_2. \quad (12)$$

Accordingly, by the equations (12) and (9), $$E_a = (I_c + I_{cc} + I_s)R + V_{ref} + \Delta V - i_5 R_{31} - R_a I_M \quad (13)$$

Now, it is assumed that the sum of the currents $i_5$ and $i_3$ flowing through the resistors $R_{31}$ and $R_{38}$, respectively, is negligible in comparison with the current $I_2$, and the current $I_M$ is approximately equal to the current $I_2$, so that the equation (13) can be reduced as follows by using the equations (1) and (8).

$$E_a = (I_{cc} + I_s)R + V_{ref} + \Delta V - i_5 R_{31} \quad (14)$$

On the other hand, assuming that the resistances of the resistors $R_{37}$ and $R_{38}$ are $R_{37}$ and $R_{38}$, respectively, and the voltage between the base and emitter of the transistor $Q_{35}$ is $V_{be35}$, the following equation can be derived:

$$i_1 = \frac{V_2 - V_{be35}}{R_{37} + R_{38}} \quad (15)$$

In addition, assuming that the resistance value of the resistor $R_{36}$ is $R_{36}$, $$i_5 = i_2 = \frac{R_{37}}{R_{36}} \cdot i_1 \quad (16)$$

Accordingly, $$i_5 R_{31} = \frac{V_2 - V_{be35}}{R_{37} + R_{38}} \frac{R_{37}}{R_{36}} \cdot R_{31} \quad (17)$$

As described above, when $$\Delta V = i_5 R_{31} \text{ or } \Delta V = \frac{V_2 - V_{be35}}{R_{37} + R_{38}} \frac{R_{37}}{R_{36}} \cdot R_{31}$$

is satisfied, the induction voltage $E_a$ in the motor would become independent of the power supply voltage $V_{cc}$. Thus, the rotational speed of the motor becomes constant irrespective of variations in the power supply voltage.

In the case where the currents $I_1$ and $I_2$ are large, the current flowing through the output circuit 11 becomes small, and the control current fed by the transistor $Q_{13}$ also becomes small resulting in the generation insufficient torque. Accordingly, the sum of the resistance values of the resistors $R_{37}$ and $R_{38}$ cannot be made extremely small as is obvious from the equation (15). On the other hand, though it is preferable to select the ratio of the currents $i_1$ and $i_2$ in the range of $5 \sim 1/5$, the resistance ratio of the resistors $R_{36}$ and $R_{37}$ cannot be made excessively large. Therefore, it is desirable to determine the currents $i_1$ and $i_2$ by the resistance of the resistor $R_{38}$. For this reason, as the resistance of the resistor $R_{38}$, the resistance range of $1 \sim 300$ K$\Omega$ is preferably selected and, as the resistances of the other resistors $R_{31}$, $R_{36}$ and $R_{37}$, values of $100\Omega \sim 5$ K$\Omega$ are selected so that $$V = i_5 R_{31} \text{ or } V = \frac{V_2 - V_{be35}}{R_{37} + R_{38}} \frac{R_{37}}{R_{36}} \cdot R_{31}$$

is satisfied.

It is noted that, in the above equation (16), the ratio of the currents $i_1$ and $i_2$ is determined by the ratio of resistances $R_{36}$ and $R_{37}$, but it can also be determined by the ratio of the base-emitter junction areas of the transistors $Q_{34}$ and $Q_{35}$. This ratio is selected in the range $5 \sim 1/5$. Moreover, this ratio can be determined by both the ratio of the base-emitter junction areas of the transistors $Q_{34}$, $Q_{35}$ and that of the resistances $R_{36}$, $R_{37}$.

The power supply voltage versus rotational speed characteristic regulator according to the present invention not only has the advantage in that hunting and high frequency oscillation caused by the high gain of error amplifier can be suppressed, but also has the additional advantage, that while the load characteristics and the voltage reduction characteristics were closely correlated in the prior art, according to the present invention only the voltage reduction characteristics can be freely varied by adjusting the component elements. Furthermore, since the component elements consist of only transistors and resistors, the circuit according to the present invention can be advantageously formed as an integrated circuit.

While the present invention has been described above as applied to a motor speed control circuit, it will be obvious that the present invention is equally applicable to a control circuits employing an error amplifier in other applications which make use of a constant voltage between a power supply terminal and an output terminal of the control circuit.

We claim:

1. A rotation speed control circuit for a motor comprising an input terminal, an output terminal, a constant voltage generator having one end connected to said input terminal, a first resistive element having one end connected to said output terminal, a comparison circuit comparing the voltage at the other end of said constant voltage generator with that at the other end of said first resistive element and deriving a comparison output, and an output circuit supplying first and second output currents to said input and output terminals, respectively, in response to said comparison output of said comparison circuit, said first resistive element generating a voltage drop in response to the variation of a voltage at said output terminal.

2. A rotation speed control circuit for a motor as claimed in claim 1, wherein to said input terminal is connected one end of a second resistive element, and to said output terminal is connected one end of a motor, the respective other ends of said second resistive element and said motor being connected in common and being connected to a power supply, terminal.

3. A rotation speed control circuit for a motor as claimed in claim 2, further comprising a current mirror circuit, said current mirror circuit having an input terminal connected to said one end of said first resistive element and an output terminal connected to said other end of said first resistive element.

4. A rotation speed control circuit for a motor as claimed in claim 3, wherein the differential voltage between the voltage at said other end of said constant voltage generator and that at said other end of first resistive element is equal to the voltage drop across said first resistive element.

5. A rotation speed control circuit or a motor as claimed in claim 2, further comprising a reference voltage terminal and third resistive element connected between said other end of said first resistive element and said reference voltage terminal.

6. A rotation speed control circuit for a motor as claimed in claim 5, wherein the differential voltage between the voltage at said other end of said constant voltage generator and that at said other end of said first resistive element is equal to the voltage produced by multiplying the sum of the resistance of said first resistive element and an internal resistance in said motor by the current flowing through the first resistive element.

7. A combination comprising a first series connection of a motor and a first current source, a second series connection of a resistor and a second current source, said first and second series connections being coupled in parallel, a detector detecting a difference between a voltage corresponding to a voltage drop across said motor and that corresponding to a voltage drop across said resistor, means for controlling currents flowing through said motor and said resistor from said first and second current sources in response to an output of said detector, and compensation means provided in a voltage transmission path from said motor to said detector for compensating for a voltage variation of a power supply voltage supplied to said first and second series connections.

8. A combination as claimed in claim 7, wherein said compensation means includes first and second resistive elements, said first resistive element being connected between a connection point of said motor and said first current source and an input terminal of said detector, and said second resistive element being connected between said input terminal of said detector and a common connection point of said first and second current sources.

9. A combination as claimed in claim 7, wherein said compensation means includes a resistive element and a current mirror circuit having input and output ends, said resistive element being connected between a connection point of said motor and said first current source and an input terminal of said detector, said input end of said current mirror circuit being connected to the connection point of said motor and said first current source, and said output end of said current mirror circuit being connected to the input terminal of said detector.

10. A motor unit comprising first and second power supply terminals, a motor having one end connected to said first power supply terminal, a first resistive element having one end connected to said first power supply terminal, a constant voltage generator having one end connected to the other end of said first resistive element, a second resistive element having one end connected to the other end of said motor, a comparison circuit having a first input end connected to the other end of said constant voltage generator and a second input end connected to the other end of said second resistive element and comparing a voltage at said first input end with that at said second input end, and an output circuit having a first output end connected to said other end of said first resistive element, a second output end connected to said other end of said motor and a reference end connected to said second power supply terminal, said output circuit supplying first and second output currents to said first resistive element and said motor through said first and second output ends, respectively, in response to a comparison output of said comparator, said second resistive element generating a voltage corresponding to a variation of a difference in voltage between said first and second input ends of said comparator caused by a voltage fluctuation of a power supply voltage supplied between said first and second power supply terminals.

11. A motor unit as claimed in claim 10 further comprising a third resistive element connected between said other end of said second resistive element and said second power supply terminal.

12. A motor unit as claimed in claim 10 further comprising a current mirror circuit having an input terminal connected to said one end of said second resistive element and an output terminal connected to said other end of said second resistive element.

* * * * *

UNITED STATES PATENT AND TRADEMARK OFFICE
CERTIFICATE OF CORRECTION

PATENT NO. : 4,345,189
DATED : August 17, 1982
INVENTOR(S) : Hirokazu FUKAYA et al.

It is certified that error appears in the above—identified patent and that said Letters Patent is hereby corrected as shown below:

Col. 2, line 61, change "motor at a" to --motor 100 at a--.

Col. 3, line 10, change "gain of the control." to --gain of the control circuit 200.--.

Col. 4, line 60, change "$\dfrac{V_{cc} - V_M}{R_{11} + R_a} (R_{11} + R_{12})$" to --$\dfrac{V_{cc} - V_M}{R_{11} + R_{12}} (R_{11} + R_a)$--.

Col. 4, lines 66-67, change "optionally" to --optimally--.

Col. 5, line 11, delete "almost";
line 32, change "b," to --$\bar{b}$,--;
line 47, change "of of" to --of-- (delete one "of");
line 59, change "$V_{cc} + V_M + V_2$" to --$V_{cc} = V_M + V_2$--.

Signed and Sealed this

Eleventh Day of January 1983

[SEAL]

Attest:

GERALD J. MOSSINGHOFF

Attesting Officer    Commissioner of Patents and Trademarks